Oct. 14, 1941.  E. F. MAAS ET AL  2,259,256
CONTAINER MAKING
Filed Nov. 23, 1940
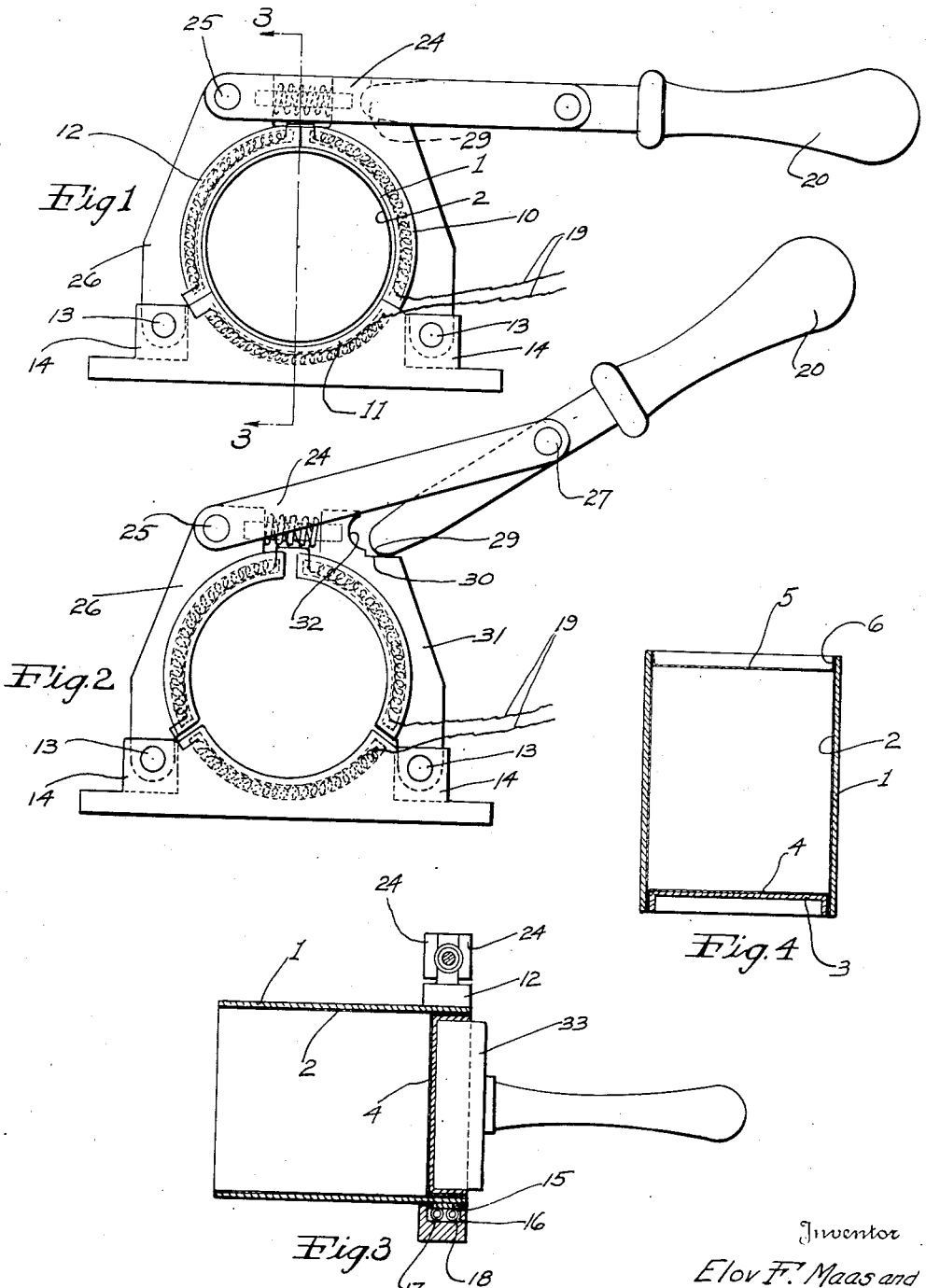
Inventor
Elov F. Maas and
Crandall R. Kline
By
Attorney Patented Oct. 14, 1941

2,259,256

UNITED STATES PATENT OFFICE 2,259,256

CONTAINER MAKING

Elov F. Maas, near Cuyahoga Falls, and Crandall R. Kline, Akron, Ohio, assignors to Wingfoot Corporation, Wilmington, Del., a corporation of Delaware Application November 23, 1940, Serial No. 366,875

4 Claims. (Cl. 93—55.1)

This invention relates to container making. More particularly it relates to apparatus and process for sealing an inverted cap of fibrous paper-like material coated with a heat-sealing compound into a cylinder of paper board coated on the interior with a heat-sealable lining.

Although considerable experimental work has been done in trying to seal such an inverted cap into such a cylinder, the previous attempts to do this have met with failure, apparently due to the fact that heat has been applied to the cap in attempting to seal it to the cylinder. The application of heat to the cap causes the cap to shrink away from the cylinder and heretofore, no tight bond has been formed between the cap and cylinder.

According to this invention the heat for uniting the heat-sealing surfaces of the inverted cap and the interior of the cylinder is applied through the wall of the cylinder. This causes the inverted cap and the coating on the interior of the cylinder to become firmly united, and any shrinking of the cylinder due to the application of heat tends to tighten the bond between the two rather than the reverse.

The cylinder may be formed of any suitable paper board, such as pasteboard or a pulp board, e. g., chip board, etc. The inverted cap will generally be made of thinner material than the cylinder, such as a heavy paper or thin chip board or the like, so that it may be turned down around the edges without breaking its heat-sealable lining.

Any heat-sealable coating may be applied to the outside of the cap and the interior of the cylinder, and the coating may be applied as a dope or as a preformed film. The invention will be further described in connection with the accompanying drawing as though the coating consists of rubber hydrochloride film united to the cylinder and cap by any suitable adhesive of which there are a number available on the market, although it is to be understood that the invention is not limited thereto. Coatings of polymerized vinyl derivatives, etc. may be used if preferred. A container, coated with unplasticized rubber hydrochloride film, is suitable for packaging foodstuffs, such as peanut butter, lard substitutes, oil dressings, jams, jellies, etc., and plasticized film may be employed where the plasticizer does not contaminate the material being packaged.

The drawing will be described as though both the cylinder and cap are made of chip board.

In the drawing Fig. 1 is an elevation, partially in section, of apparatus which may be employed in carrying out the invention. Fig. 2 is a similar view of the same apparatus in opened position and with the handle raised. Fig. 3 is a side view on the line 3—3 of Fig. 1, and Fig. 4 is an elevation in section of the container.

The container is formed from a section 1 of a continuous cylinder of chip board or the like which is coated on the interior with the rubber hydrochloride film 2. The cylinder is preferably coated with the rubber hydrochloride before being cut into sections. The bottom is an inverted cap 3 of thin chip board coated on the interior with rubber hydrochloride film 4. The rubber hydrochloride film 4 covers the edges of the inverted cap, so that when the cap is inserted in the cylinder the coating 4 on the cap contacts the film coating 2 on the interior of the cylinder. The container may be closed by sealing a rubber hydrochloride film 5 into the top of the container. The upturned edges 6 of the film 5 may be heat-sealed to the coating 2 of the container in any desired manner, for example, in much the same way that the cap 3 is sealed into the bottom of the container.

To unite the cylindrical wall 1 to the inverted cap 3 heat is applied to the exterior of the wall 1 over the area of the cylinder with which the inverted cap comes in contact. The inverted cap 3 may be pushed into one end of the cylinder and then this end of the cylinder may be forced down into a heated ring which, for example, may be slightly tapered. In this way the entire circumference of the bottom of the cylinder is heated simultaneously. A preferred method of applying the heat is disclosed more in detail in the drawing.

The device for carrying out the preferred procedure comprises an annular ring divided into several parts, such as the three parts 10, 11 and 12 shown in the drawing. The section 11 is formed on the base of the apparatus. The two sections 10 and 12 are pivoted on the pins 13 between the ears 14. Each of the sections 10, 11 and 12 comprises a surface plate 15 preferably of a heat-conducting material, such as aluminum, and under this surface plate 15, a channel 16 which is shown in section in Fig. 3. In the channel are two heating coils 17 and 18 which are supplied with current from the wires 19.

Figs. 1 and 3 show the heating ring closed and the container within the ring. Fig. 2 shows the handle 20 lifted and the heating ring open. In order to permit the insertion and removal of the container within the ring, it is not necessary to open the ring more than a fraction of an inch, and this is all that the device shown permits. The ring is of such size that after inserting the container and closing the ring by lowering the handle, the container is subjected to considerable pressure in the area gripped by the ring but not sufficient pressure to damage the container. The pressure is, however, sufficient to provide efficient heat transfer between the ring and the container.

Identical arms 24 are pivoted on the pin 25 to the wing 26 which flares out from the portion 12 of the annular heating ring. The other ends of these arms 24 are held by the pin 27 which passes through the tongue 28. The tongue 28 is located between the two arms 25. The handle 20 is fastened to the outer end of the tongue 28. As shown in Fig. 2, when the ring is open, the end 29 of the tongue 28 rests on the shelf 30 formed on the wing 31. To close the ring the end of the tongue 29 is lifted into the socket 32 as the handle 20 is lowered and the top portions of the segments 10 and 12 of the ring are brought together as shown in Fig. 1.

To support the wall of the cylinder when the ring is closed and to press the two rubber hydrochloride surfaces together a plug 33 (shown in Fig. 3) is inserted into the inverted cap. Instead of using a solid plug, such as illustrated in Fig. 3, a suitable type of expandable mandrel may be employed. By expanding the mandrel within the inverted cap at the same time that pressure is applied to the exterior of the cylinder, the two layers of rubber hydrochloride film 2 and 4 on the interior of the cylinder and the exterior of the inverted cap are brought into close contact and by the application of pressure, efficient heat transfer is maintained, so that although the heat is applied only to the exterior of the cylinder the layers of rubber hydrochloride film within the cylinder may be quickly raised to the temperature required to cause them to unite. The temperature to which the heating plates 15 must be heated will depend upon the thickness of the cylinder wall and the length of time during which the cylinder is kept in contact with these plates. With one type of container it is found, for example, that by heating to a temperature of about 220° C., it required fifteen seconds to form a tight bond between the two layers of rubber hydrochloride film. Using the same apparatus and similar stock it was found that by heating to a temperature of about 500° C., a satisfactory seal was formed in less than one-tenth of a second. It is thus evident that the seal may be quickly formed and by applying the heat to the outside of the cylinder a liquid-tight and permanent bond is formed.

What we claim is:

1. The process of sealing an inverted flanged cap of paper-like material into the end of a paper board cylinder, the inverted cap being coated on the exterior and the cylinder being coated on the interior with heat-sealable material, which process comprises uniting the heat-sealable layers by supplying heat thereto sufficient to form a permanent bond between the two said layers, all of said heat being supplied to the heat-sealable material through the wall of the cylinder, and while supporting the cylinder against collapse from within the inverted cap, applying pressure to the exterior of the cylinder, thereby firmly uniting the heat-sealable coating on the exterior of the flange of the cap with the heat-sealable coating on the interior of the cylinder.

2. The process of sealing an inverted flanged cap of paper-like material into the end of a paper board cylinder, the inverted cap being coated on the exterior and the cylinder being coated on the interior with rubber hydrochloride which process comprises uniting the rubber hydrochloride layers by supplying heat thereto sufficient to form a permanent bond, all of said heat being supplied to the rubber hydrochloride through the wall of the cylinder, and while supporting the cylinder against collapse from within the inverted cap, applying pressure to the exterior of the cylinder, thereby firmly uniting the rubber hydrochloride coating on the exterior of the flange of the cap with the heat-sealable coating on the interior of the cylinder.

3. Apparatus for sealing an inverted cap of paper-like material coated on the exterior with a heat-sealable film into one end of a paper board cylinder coated on the interior with heat-sealable material which comprises a pressure-resisting insert adapted to fit snugly into the cap and an annular ring divided into segments and adapted to fit snugly around said end of the cylinder, means for heating the segments, and means for bringing the segments together to form an annular ring.

4. Apparatus for sealing an inverted cap of paper-like material coated on the exterior with a heat-sealable film into one end of a cylinder of paper board coated on the interior with heat-sealable material which comprises a pressure-resisting insert adapted to fit snugly into the cap and an annular ring divided into three segments including a base segment and two side segments pivoted to the base segment, means for heating the interior surfaces of the segments and means for bringing the segments together to form a ring.

ELOV F. MAAS.
CRANDALL R. KLINE.